INVENTOR.
Kestutis Norvaisa
BY
Brown and Mikulka
and
Leonard S. Selman
ATTORNEYS 3,582,424
FABRICATION OF POLARIZING DEVICE
Kestutis Norvaisa, South Boston, Mass., assignor to
Polaroid Corporation, Cambridge, Mass.
Filed Sept. 1, 1967, Ser. No. 665,073
Int. Cl. B29c 3/00
U.S. Cl. 156—244                                13 Claims

ABSTRACT OF THE DISCLOSURE

This disclosure relates to a multilayered highly efficient polarizer, sometimes called a total polarizer, and to the fabrication thereof.

BACKGROUND AND SUMMARY OF THE INVENTION

This invention is concerned with the improvements in relation to the fabrication of certain multilayered polarizing devices such as those disclosed in U.S. Pat. No. 3,213,753, issued Oct. 26, 1965, and assigned to the same assignee. Of special concern are those polarizers wherein an isotropic layer or sheet of material is located between two layers or sheets of birefringent material and the pair of interfaces between the layers comprise uniformly lenticulated or otherwise configured surfaces, the lenticulations of one interface being accurately located relative to the lenticulations of the other interface. The accurate spatial relationship is important to the operability of the polarizer since the lenticules focus the component rays of the light passing through the polarizer such that they may be properly treated before exiting from the polarizer in a manner to produce uniformly and substantially totally polarized transmitted light. The term total polarizer as used herein refers to a particular kind of polarizer, usually multilayered, which selectively polarizes most of the randomly polarized light incident thereon in contrast to other polarizers where a much larger proportion of the incident light is not so polarized. Among the problems to be solved include the formation of the lenticules, the maintenance of their desired shape during laminating or forming the layered structure and the exact alignment of the lenticules of the various interfaces with one another. The pair of birefringent layers may be lenticulated by pressing with a configurated die; then the isotropic material, softened by heat, may be pressed between the lenticulated surfaces of the birefringent layers. However, these operations can result in the flattening of a number of lenticulations which, of course, degraded the optical quality of the total polarizer structure. Further, it is sometimes extremely difficult to maintain the aforementioned exact alignment of the lenticulated interfaces during the laminating operation. The present invention proposes an improvement in techniques of manufacturing total polarizers by preforming the isotropic layer between dies produced from the same dies used to form the lenticulations in the birefringent sheets. Besides avoiding the problem of flattening the lenticulations, the isotropic layer, now configured with a pair of lenticulated surfaces, becomes an accurate form on which to assemble the two cooperating lenticulated birefringent sheets so that the lenticulations are precisely aligned and offset by precisely the right amount. This avoids the necessity of trying to maintain the two lenticulated birefringent sheets in exact registry while performing a pressing operation at elevated temperatures and pressures.

Other means of forming the configurations or lenticulations in the surfaces of the birefringent and isotropic sheets may include molding techniques utilizing the same molds for forming the matching configurated or lenticulated surfaces or extrusion techniques wherein the same extrusion type dies are used to extrude matching surfaces on the birefringent and isotropic sheets.

Accordingly, it is an object of this invention to provide a process for fabricating a multilayer polarizer.

It is a further object of this invention to provide a process for fabricating a multilayer polarizer wherein lenticulated surfaces are formed on certain of said layers and the lenticulated surface of one layer of said polarizer is used as a form on which to assemble the lenticulated surfaces of others of said layers.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

DESCRIPTION OF THE PREFERRED METHOD

Before describing the fabrication method in detail for this multilayer total polarizer, it is well to consider the importance of each step to the proper functioning of the device. A slight flattening of the lenticulations during a pressing or laminating step can seriously impair the optical quality of the resulting total polarizer, since light rays may then be incorrectly directed. The exact alignment of the lenticulations with respect to the optic axis of the birefringent layers upon which they are formed as well as the optic axis of adjacent layers is important to the efficiency of the polarizer in producing uniformly polarized emitted light. Thus, the fabricating techniques described herein which prevent flattening or misalignment of lenticulations are closely related to the achievement of a product truly capable of polarizing light in a most efficient manner.

Figure 1:
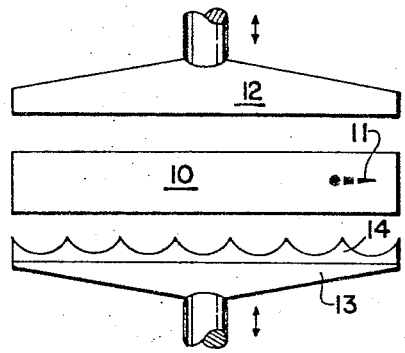
FIG. 1 is a side elevation showing suitable apparatus for performing one step in the method of this invention.
Figure 4:
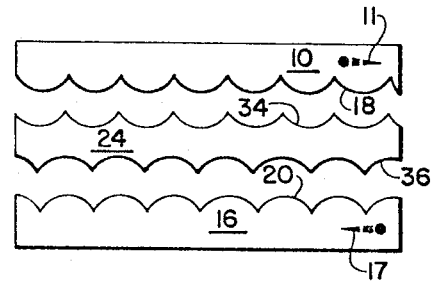
FIG. 4 is a side elevation showing the use of one layer of the fabricated polarizer of the invention to serve as a form for the other layers.

The sheet 10 shown in FIG. 1 may be composed of a birefringent material that has been subjected to a mechanical stressing operation to molecularly orient it in the presence of heat or another softening agent producing a layer with the optic axis 11. For this example, the lenticulations have been formed in sheet 10 with their length direction at precisely a 45° angle to the optic axis 11 thereof. FIG. 1 illustrates the pressing step or operation about to take place whereby sheet 10 is placed between platen means 12 and platen means 13, having configurated die 14 mounted thereon. A drive means, not shown, urges said platens toward one another and the deformable sheet 10 which has been preheated is pressed to form a series of lenticulations 18 on one surface thereof, as shown in FIG. 4. In fabricating the symmetrical polarizer as utilized in the preferred embodiment, it becomes apparent that those sheets forming both the entrance and exit layers 10 and 16 of the polarizer shown in FIG. 4 may be formed on the platens as shown in FIG. 1 since the sheets are identical to one another. It is also convenient that when the lenticulated surfaces of the sheets 10 and 16 are facing each other as shown in the final product of FIG. 5, the optic axes of the sheets made identically, with axes 11 and 17 at 45° to the length of the lenticulations, are oriented at exactly the desired angular relationship with one another (as an example, the optic axes of layers 10 and 16 of FIG. 4 are oriented +45° and —45° to the length direction of the lenticulations 18 and 20 and 90° from one another).

Figure 2:
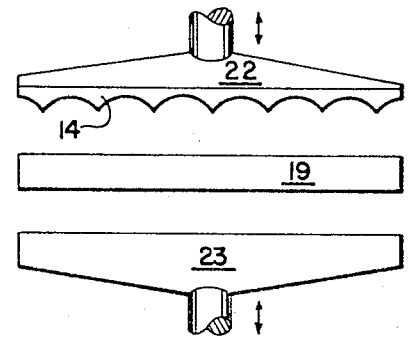
FIG. 2 is a side elevation showing suitable apparatus for performing a particular forming step in the method of this invention.
Figure 3:
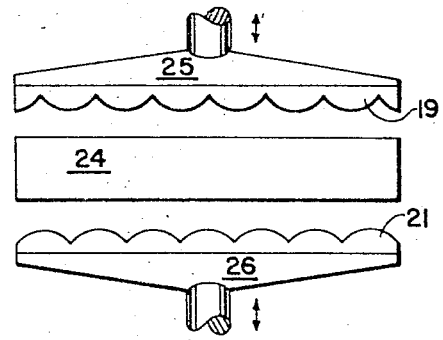
FIG. 3 is another side elevation showing suitable apparatus for performing another step in the method of this invention.

FIG. 2 shows the forming step wherein dies 19 and 21, shown in FIG. 3, are produced by utilizing the same configurated die 14 used to form the lenticulations in sheets 10 and 16. The dies 19 and 21 may consist of lead, for example, which is softened so that the steel configurated die 14 may press form an exactly matching configuration therein. The die 14 is mounted upon platen means 22 and 23 which are driven toward one another by drive means, not shown.

FIG. 3 of the drawing shows the apparatus used to form the isotropic sheet 24 consisting of the pair of configurated dies 19 and 21 mounted on platen means 25 and 26 and offset from one another by the distance of one-half the width of a single lenticule. A drive means, not shown, urges the platen means 25 and 26 toward one another and the preheated isotropic sheet 24 is pressed to form the offset lenticulated surfaces in the opposed surfaces 34 and 36 thereof.

FIG. 4 is a schematic view which illustrates how sheet 24 serves as a form for aligning the lenticulated surfaces of birefringent sheets 10 and 16. The lenticulations match exactly at the interfaces, because the same configurated die 14 was used to form the lenticulations in the birefringent sheets as well as the configurated dies 19 and 21 which are used to form the lenticulations in the isotropic sheet. The three sheets 10, 16 and 24 may then be joined by any of the known methods to form the multilayered polarizer as shown in FIG. 4. For example, a transparent bonding means such as Dupont Mylar adhesive No. 46971, sold by E. I. du Pont de Nemours Co., Wilmington, Del., U.S.A., may be employed or in the alternative heat may be used to slightly soften the adjoining surfaces causing them to bond together.

Figure 5:
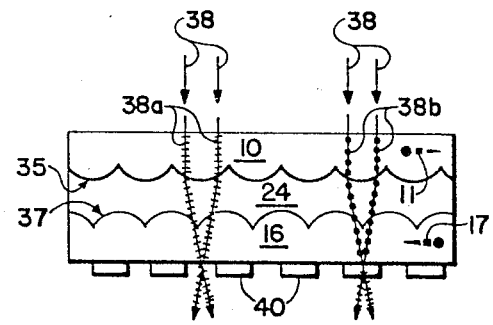
FIG. 5 is a side elevation showing a polarizer fabricated according to the method of the present invention.

FIG. 5 illustrates a multilayer lenticulated light polarizing device comprising the birefringent layers 10 and 16 and an isotropic layer 24 formed from a suitable, transparent material. As described in the above-mentioned U.S. Pat. No. 3,213,753, in relation to such a polarizer, the isotropic layer 24 may have a refractive index which matches the lower of the pair of indices of each birefringent layer 10 and 16 resulting in refraction at each lenticulated interface 35 and 37 of one of the polarized components 38a and 38b of entering beam 38. Retardation strips 40 may be bonded to the exit surface for providing a uniform direction of polarization to the intercalated sets of rays 38a and 38b which are focused in the vicinity of the exit surface.

The layers 10 and 16 may be composed, for example, of transparent polyethylene terephthalate of optical quality which has been rendered birefringent. Material of this composition designated "Mylar" is sold by E. I. du Pont de Nemours Co., Wilmington, Del., U.S.A. Layer 24 may suitably be composed of a transparent optical quality plastic material as, for example, a methacrylate, such as cyclohexylmethacrylate.

As mentioned previously, other means of forming the configurations or lenticulations in the surfaces of the birefringent and isotropic sheets may include molding techniques utilizing the same molds for forming the matching configurated or lenticulated surfaces or extrusion techniques wherein the same extrusion type dies are used to extrude matching surfaces on the birefringent and isotropic sheets.

Since certain changes may be made in the above method without departing from the scope of the invention herein involved, it is intended that all matter contained in the above description or shown in the accompanying drawings shall be interpreted as illustrative and not in a limiting sense.

I claim:

1. The method of constructing a polarizer in which a sheet of isotropic material is bounded by a pair of configured birefringent sheets comprising:
    forming configurations in a surface of each said forming configurations, in the opposite surfaces of said isotropic sheet, of suitable shape to mate with said configurations formed in said surfaces of said birefringent sheets;
    assembling said birefringent and said isotropic sheets together using the isotropic sheet as a form on which to assemble the two cooperating configurated birefringent sheets; and
    bonding said isotropic and birefringent sheets together to form said polarizer.

2. The method of constructing a polarizer in which a sheet of isotropic material is bounded by a pair of configured birefringent sheets comprising:
    pressing each said birefringent sheet with a configurated die to form configurations in a surface thereof;
    pressing said sheet of isotropic material between a pair of configurated dies to form configurations, in the opposing surfaces of said isotropic sheet, of suitable shape to mate with said configurations formed in said surfaces of said birefringent sheets;
    assembling said birefringent and said isotropic sheets together using the isotropic sheet as a form on which to assemble the two cooperating configurated birefringent sheets; and
    bonding said isotropic and birefringent sheets together to form said polarizer.

3. The method of claim 2 wherein heat is applied to soften both of said birefringent and said isotropic sheets before pressing.

4. The method of constructing a polarizer in which a sheet of isotropic material is bounded by a pair of birefringent sheets comprising:
    pressing each birefringent sheet with a configurated die to form lenticulations in a surface thereof;
    pressing said sheet of isotropic material between a pair of configurated dies to form a series of lenticulations in the opposing surfaces of said isotropic sheet, of suitable shape to mate with said lenticulations formed in said surfaces of said birefringent sheets;
    assembling said birefringent and isotropic sheets together using the isotropic sheet as a form on which to assemble the two cooperating lenticulated birefringent sheets so that the lenticulations on said birefringent sheets are precisely aligned; and
    bonding said isotropic and birefringent sheets together to form said polarizer.

5. The method of construcing a polarizer in which a sheet of isotropic material is bounded by a pair of birefringent sheets comprising:
    pressing each birefringent sheet with a configurated die to form lenticulations in a surface thereof;
    pressing said sheet of isotropic material between a pair of configurated dies to form a series of offset mating lenticulations, in the opposing surfaces of said isotropic sheet, of suitable shape to mate with said lenticulations formed in said surfaces of said birefringent sheets;
    assembling said birefringent and isotropic sheets together using the isotropic sheet as a form on which to assemble the two cooperating lenticulated birefringent sheets so that the lenticulations on said birefringent sheets are precisely aligned and offset by precisely the right amount; and
    bonding said isotropic and birefringent sheets together to form said polarizer.

6. The method of constructing a multilayered high efficient polarizer in which a sheet of isotropic material is bounded by a pair of lenticulated birefringent sheets, comprising:

pressing a pair of sheets of optical quality transparent birefringent material with a configurated die to form a series of uniform lenticulations in one surface of said transparent sheets;

pressing a sheet of optical quality isotropic transparent material with a pair of configurated dies to form a series of offset lenticulations, of suitable shape to mate with said lenticulations formed in said birefringent layers, in the opposing surfaces of said isotropic sheet;

assembling said birefringent and isotropic sheets together using the isotropic sheet as a form on which to assemble the two cooperating lenticulated birefringent sheets so that the lenticulations on said birefringent sheets are precisely aligned and offset by precisely the right amount; and bonding said isotropic and birefringent sheets together to form said polarizer.

7. The method of constructing a polarizer in which a sheet of isotropic material is bounded by a pair of birefringent sheets, comprising:

pressing each birefringent sheet with a configurated die to form configurations in a surface thereof;

forming a pair of complementary configurated dies by pressing a deformable material with said first configurated die to form a surface on each of said pair of dies which conforms exactly to said configurated die;

pressing said sheet of isotropic material between said pair of complementary configurated dies to form a series of configurations in the opposing surfaces of said isotropic sheet of suitable shape to mate with said configurations formed in said surfaces of said birefringent sheets;

assembling said birefringent and isotropic sheets together, using the isotropic sheet as a form on which to assemble the two cooperating configurated birefringent sheets; and bonding said isotropic and birefringent sheets together to form said polarizer.

8. The method of claim 7 wherein heat is applied to soften both of said birefringent and said isotropic sheets before pressing.

9. The method of constructing a polarizer in which a sheet of isotropic material is bounded by a pair of birefringent sheets, comprising:

pressing each birefringent sheet with a configurated die to form lenticulations in a surface thereof;

forming a pair of complementary configurated dies by pressing a deformable material with said first configurated die to form a surface on each of said pair of dies which conforms exactly to said configurated die;

pressing said sheet of isotropic material between said pair of complementary configurated dies to form a series of lenticulations in the opposing surfaces of said isotropic sheet of suitable shape to mate with said lenticulations formed in said surfaces of said birefringent sheets;

assembling said birefringent and isotropic sheets together, using the isotropic sheet as a form on which to assemble the two cooperating lenticulated birefringent sheets so that the lenticulations on said birefringent sheets are precisely aligned; and bonding said isotropic and birefringent sheets together to form said polarizer.

10. The method of constructing a polarizer in which a sheet of isotropic material is bounded by a pair of birefringent sheets, comprising:

pressing each birefringent sheet with a configurated die to form lenticulations in a surface thereof;

forming a pair of complementary configurated dies by pressing a deformable material with said first configurated die to form a surface on each of said pair of dies which conforms exactly to said configurated die;

pressing said sheet of isotropic material between said pair of complementary configurated die to form a series of offset lenticulations in the opposing surfaces of said isotropic sheet of suitable shape to mate with said lenticulations formed in said surface of said birefringent sheets;

assembling said birefringent and isotropic sheets together, using the isotropic sheet as a form on which to assemble the two cooperating lenticulated birefringent sheets so that the lenticulations on said birefringent sheets are precisely aligned and offset by precisely the right amount; and bonding said isotropic and birefringent sheets together to form said polarizer.

11. The method of claim 1 wherein the configurations in the birefringent and isotropic sheets are formed by molding.

12. The method of claim 1 wherein the configurations in the birefringent and isotropic sheets are formed by extrusion.

13. The method of constructing a polarizer in which a sheet of isotropic material is bounded by a pair of configured birefringent sheets comprising:

forming configurations in a surface of each said birefringent sheet;

contouring the opposite surfaces of said isotropic sheet to mate with said configurations in said birefringent sheets;

sandwiching said isotropic sheet between said birefringent sheets so as to have said contoured surfaces mate with said configured surfaces, whereby substantially all of said contoured surface area contacts said configured surface area; and bonding said isotropic and birefringent sheets together.

References Cited

UNITED STATES PATENTS 3,205,110 9/1965 Rinderspacher et al. _ 156—245X
3,219,516 11/1965 Cobbledick _____ 156—245X BENJAMIN R. PADGETT, Primary Examiner S. J. LECHERT, Jr., Assistant Examiner U.S. Cl. X.R.

88—65; 156—219, 245, 306